United States Patent
Mukai et al.

[11] Patent Number: 6,131,693
[45] Date of Patent: Oct. 17, 2000

[54] ELECTRIC POWER STEERING APPARATUS

[75] Inventors: Yoshinobu Mukai; Yoshiki Noro, both of Wako, Japan

[73] Assignee: Honda Giken Kogyo Kabushiki Kaisha, Tokyo, Japan

[21] Appl. No.: 09/139,988

[22] Filed: Aug. 26, 1998

[30] Foreign Application Priority Data

Aug. 27, 1997 [JP] Japan ................................. 9-231412

[51] Int. Cl.$^7$ ......................................................... B62D 5/04
[52] U.S. Cl. .................................................. 180/446; 180/443
[58] Field of Search .................................. 180/442, 443, 180/446; 701/36, 41, 42, 43, 44

[56] References Cited

U.S. PATENT DOCUMENTS

| | | | |
|---|---|---|---|
| 4,637,483 | 1/1987 | Eto et al. ................................. | 180/142 |
| 4,653,601 | 3/1987 | Nakamura et al. ...................... | 180/79.1 |
| 4,664,211 | 5/1987 | Oshita et al. ............................ | 180/142 |
| 4,674,588 | 6/1987 | Yasua et al. ............................. | 180/142 |
| 4,715,463 | 12/1987 | Shimizu ................................. | 180/79.1 |
| 4,753,308 | 6/1988 | Noto et al. .............................. | 180/79.1 |
| 4,834,203 | 5/1989 | Takahashi et al. ...................... | 180/79.1 |
| 4,842,088 | 6/1989 | Oshita et al. ............................ | 180/79.1 |
| 4,926,960 | 5/1990 | Ishikura et al. ......................... | 180/79.1 |
| 5,053,966 | 10/1991 | Takahashi et al. .................. | 364/424.05 |
| 5,201,818 | 4/1993 | Nishimoto .............................. | 180/79.1 |
| 5,448,482 | 9/1995 | Yamamoto et al. ................. | 364/424.05 |
| 5,481,457 | 1/1996 | Yamamoto et al. ................. | 364/424.05 |
| 5,528,497 | 6/1996 | Yamamoto et al. ................. | 364/424.05 |
| 5,659,473 | 8/1997 | Noro et al. .......................... | 364/424.05 |
| 5,699,249 | 12/1997 | Noro et al. .......................... | 364/424.05 |
| 5,835,872 | 11/1998 | Matsuoka et al. ....................... | 701/41 |
| 5,844,387 | 12/1998 | Makai et al. ............................. | 318/432 |
| 5,894,205 | 4/1999 | Shimizu et al. ......................... | 318/432 |

FOREIGN PATENT DOCUMENTS

| | | | |
|---|---|---|---|
| 59468 | 3/1999 | Japan ..................................... | 180/443 |
| 59469 | 3/1999 | Japan ..................................... | 180/443 |

*Primary Examiner*—Paul N. Dickson
*Attorney, Agent, or Firm*—Merchant & Gould P.C.

[57] ABSTRACT

An electric power steering apparatus includes a control unit designed to be responsive to acceleration and deceleration of the vehicle and forward and revere movements of the vehicle for correcting a steering assist torque to be supplied from an electric motor to the steering system of a vehicle. The control unit includes an acceleration and deceleration calculating section, a front wheel load calculating section, a phase compensating section, a main control amount setting section and a damping correction value setting section. The acceleration and deceleration calculating section determines acceleration and deceleration on the basis of the direction and magnitude of a vehicle velocity detected by a vehicle velocity sensor. The front wheel load calculating section determines a front wheel load variation on the basis of the acceleration and deceleration. The phase compensating section perform phase compensation of a steering torque on the basis of the front wheel load variation. The main control amount setting section sets a main control amount on the basis of the phase-compensated torque and the vehicle velocity. The damping correction value setting section sets a damping correction value on the basis of the front wheel load variation. The main control amount and the damping correction value are used to determined a correction control amount which is used for controlling a current to be supplied to the electric motor.

9 Claims, 6 Drawing Sheets

ELECTRIC POWER STEERING APPARATUS

BACKGROUND OF THE INVENTION

1. Field of the Invention

The present invention relates to improvements in an electric power steering apparatus for applying power from an electric motor to the steering system of a vehicle to lighten the manual steering effort of the driver.

2. Description of the Related Art

FIG. 6 of the accompanying drawings shows in block diagram a control unit 120 of a conventional electric power steering apparatus.

The control unit 120 generally includes a motor drive control section 130 and a motor drive section 140. In FIG. 6 reference character BAT denotes a battery power source, and reference numeral 125 denotes a motor current detecting unit or sensor for detecting a current flowing actually in an electric motor 110 and generating a motor current signal (hereinafter referred to as "motor current") IM corresponding to the detected motor current.

The motor drive control section 130 determines, on the basis of a steering torque signal T output from a steering torque sensor 112, a basic current value to be supplied to the electric motor 110 for enabling the electric motor 110 to produce a steering assist torque corresponding the steering torque, corrects the basic current value according to a vehicle velocity V detected by a vehicle velocity sensor 114, and outputs the corrected basic current value as a motor drive control signal (target current signal) IT. The motor drive control signal IT is supplied to the motor drive section 140.

The motor drive section 140 includes an offset calculating part or calculator 141, a PID (proportional plus integral plus derivative) control part or controller 142, a PWM (pulse-width modulation) signal generating part or generator 143, a gate drive circuit part or circuit 144, and a motor driving circuit 145 consisting of four power field-effect transistors (FET's) connecting in an H-type bridge.

The offset calculator 141 determines by calculation an offset between the motor drive control signal (target current signal) IT and the motor current IM detected by the motor current sensor 125 and outputs an offset signal 141a. The offset signal 141a is supplied to the PID controller 142.

The PID controller 142 performs PID (proportional plus integral plus derivative) control action about the offset signal 141a and generates and outputs a drive control signal 142a for controlling a current to be supplied to the electric motor 110 in such a way that the offset approaches zero. The drive control signal 142a is supplied to the PWM signal generator 143.

The PWM signal generator 143 generates a PWM signal 143a for PWM-driving the electric motor 110 on the basis of the drive control signal 142a and outputs the generated PWM signal 143a to the gate drive circuit 144. The gate drive circuit 144 drives the gates of the respective FET's on the basis of the PWM signal 143a.

The control unit 120 PWM-controls power supplied from the battery power source BAT to the electric motor 110 on the basis of the steering torque T detected by the steering torque sensor 112 and the vehicle velocity detected by the vehicle velocity sensor 114 and thereby controls the output power (steering assist torque) of the electric motor 110 which is to be applied to the steering system.

The force needed to steer front wheels (steerable wheels) of the vehicle, namely, the steering torque becomes a maximum when it is exerted while the vehicle is at rest, and this force becomes smaller as the vehicle velocity increases. In the conventional electric power steering apparatus, the ratio of manual steering torque (applied by the driver) and steering assist torque (applied by the electric motor 110), usually called "assist ratio", is varied according to the vehicle velocity to thereby improve the steering touch or feeling.

The steering torque to be exerted in conjunction with a start of the vehicle in the forward direction (hereinafter referred to as "forward start") is not the same as the steering torque to be exerted in conjunction with a start of the vehicle in the backward direction (hereinafter referred to as "backward start"). The steering torque is also varies with acceleration and deceleration of the vehicle. By virtue of the shift of a vehicle load caused due to acceleration and deceleration of the vehicle, the load or force acting on the front wheels increases when the vehicle makes a backward start or it is moving forward with decelerated velocity and decreases when the vehicle makes a forward start or it is moving forward with accelerated velocity. A change (increase or decrease) in the load on the front wheels directly causes a change in the so-called tire spring component (such as the spring characteristics, viscosity and friction of a mechanical system including tires that are variable with the ground-contact pressure or load). This phenomenon becomes remarkable as the weight of the vehicle or the level of the center of gravity of the vehicle increases.

Since the conventional electric power steering apparatus has no means for correcting the assist ratio in consideration of the forward start, backward start and acceleration and deceleration of the vehicle, a steering operation accompanying frequent forward and backward starts of the vehicle (which is due for parking or garaging, for example) cannot provide a steering assist well adaptable to the change of the tire spring component. Accordingly, due to an insufficient assist ratio, the force that must be exerted by the driver increases, the delay in assist response becomes large as the tire damping component increases, or the steering wheel is caused to oscillate. Thus, a good steering feel cannot be obtained.

Additionally, since the conventional electric power steering apparatus is generally tuned or adjusted in such a manner as to deal with only part of the forgoing problems arising from the forward start of the vehicle, the rest of the problems may still occur in conjunction with the backward start and acceleration and deceleration of the vehicle.

SUMMARY OF THE INVENTION

It is accordingly an object of the present invention to provide an electric power steering apparatus which can provide a good steering touch or feeling even when the tire spring component is changed due to acceleration and deceleration of the vehicle, and advancing and reversing conditions of the vehicle.

In one aspect the present invention provides an electric power steering apparatus for a vehicle, comprising: an electric motor for applying a steering assist torque to a steering system of the vehicle; a steering torque sensor for detecting a steering torque of the steering system; an acceleration and deceleration detector for detecting acceleration and deceleration of the vehicle; and a control unit for controlling operation of the electric motor on the basis of an output signal from the steering torque sensor and an output signal from the acceleration and deceleration detector.

The acceleration and deceleration detector preferably detects a change in the load on front wheels of the vehicle resulting from a shift of the vehicle load caused due to acceleration or deceleration of the vehicle. The acceleration and deceleration detector includes a vehicle velocity sensor for detecting a velocity of the vehicle, an acceleration and deceleration calculating section for calculating acceleration and deceleration on the basis of the vehicle velocity detected by the vehicle velocity sensor, and a front wheel load calculating section for calculating a change in the load on front wheels of the vehicle on the basis of the acceleration and deceleration detected by the acceleration and deceleration detector.

The electric power steering apparatus of the foregoing construction can properly correct the steering assist torque in accordance with acceleration and deceleration of the vehicle. When a steering operation is taken along with repeated acceleration and deceleration or repeated forward and backward movements of the vehicle (as at parking and garaging), the apparatus can provide an assist torque well adaptable to a change in the tire spring component. The steering operation is, therefore, performed smoothly and stably without causing an insufficient assist ratio, a delay in assist response, or vibration of the steering system. A good steering feed can therefore be obtained. The control unit of the invention is particularly advantageous for a steering operation taken while the vehicle is moving backward in which instance the driver in most cases operates the steering wheel with one hand.

In another aspect of the present invention, there is provided an electric power steering apparatus for a vehicle, comprising: an electric motor for applying a steering assist torque to a steering system of the vehicle; a steering torque sensor for detecting a steering torque of the steering system; a forward and reverse sensor for detecting whether the vehicle is moving in the forward direction or in the backward direction; and a control unit for controlling operation of the electric motor on the basis of an output signal from the steering torque sensor and an output signal from the forward and reverse sensor. With this construction, the electric power steering apparatus can change the assist force on the basis of the output signal from the steering torque sensor and the output signal from the forward and reverse sensor.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
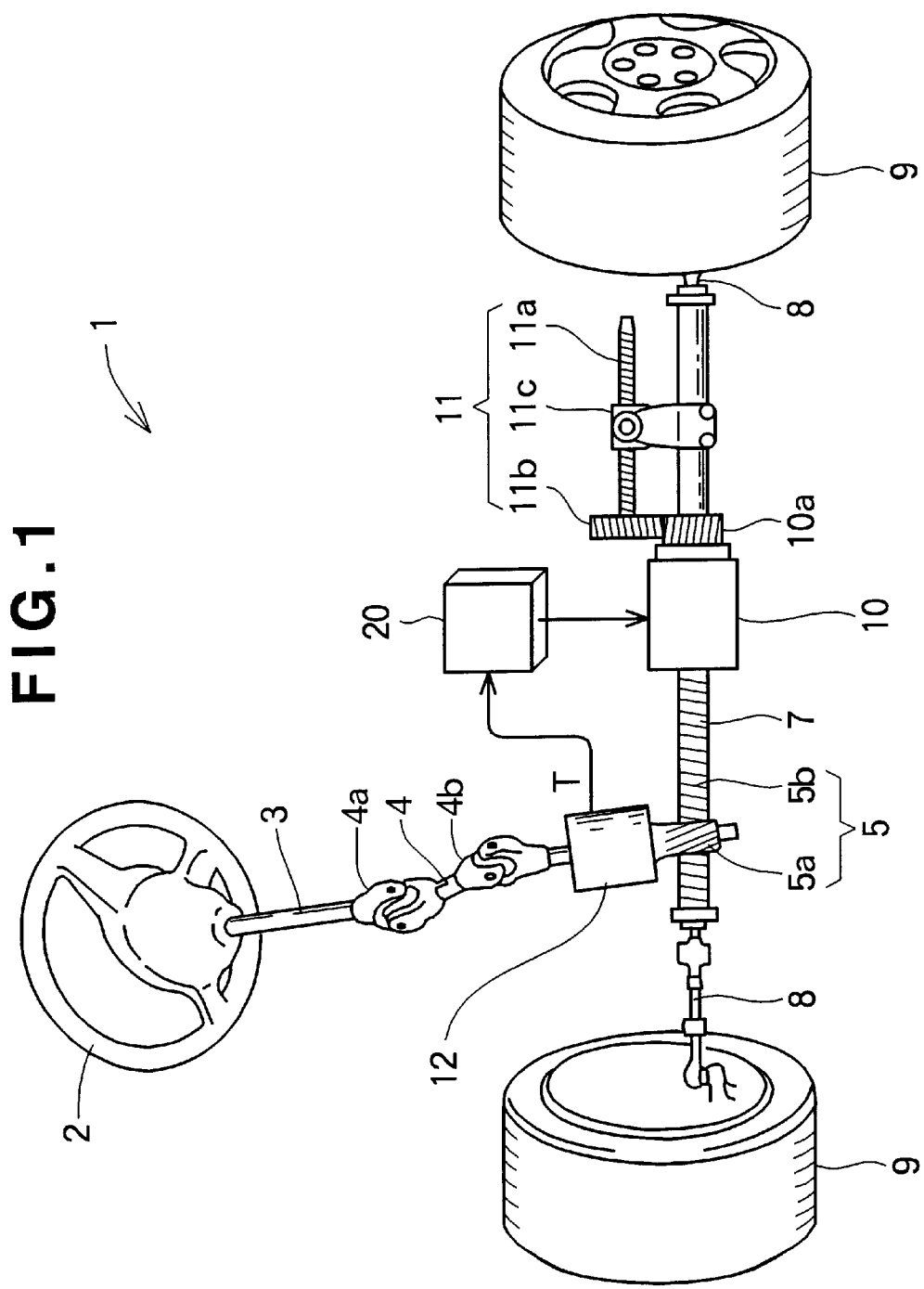
FIG. 1 is a diagrammatical view showing the general construction of an electric power steering apparatus according to the present invention.

Referring now to FIG. 1, there is shown the general construction of an electric power steering apparatus embodying the present invention. The electric power steering apparatus 1 includes a steering wheel 2 firmly connected to one end (upper end) of a steering column or shaft 3, the other end (lower end) of the steering shaft 3 being operatively connected by a connecting shaft 4 having universal couplings 4a, 4b to a pinion 5a of a rack-and-pinion mechanism 5 contained in a steering gearbox (not shown). The rack-and-pinion mechanism 5 includes a rack shaft 7 having a rack 5b of gear teeth which is in mesh with the pinion 5a. Thus, rotation of the pinion 5a is converted into linear reciprocation of the rack shaft 7. The opposite ends of the rack shaft 7 are connected by tie rods 8, 8 to steerable left and right front wheels 9, 9 of a vehicle. When the steering wheel 2 is turned or rotated, the front wheels 9, 9 are turned or steered by way of the rack-and-pinion mechanism 5 and the tie rods 8, 8. The components 2–9 described above jointly constitute a steering system of the vehicle.

To lighten the driver's effort needed to turn the steering wheel 2, an electric motor 10 is mounted concentrically with the rack shaft 7 so as to apply a steering assist force or torque to the rack shaft 7 via a ball-screw mechanism (often referred to as "ball-nut mechanism") 11. The ball-screw mechanism 11 is composed of a screw shaft 11a extending parallel with the rack shaft 7, a drive helical gear 10a integral with a rotor of the electric motor 10, a driven helical gear 11b fixedly mounted on one end of the screw shaft 11a and held in mesh with the drive helical gear 10a, and a nut 11c firmly connected to the rack shaft 7 and threadedly engaged with the screw shaft 11a with recirculating balls (not shown) interposed between the screw shaft 11a and the nut 11c.

The electric power steering apparatus further includes a steering torque sensor 12 disposed in the steering gearbox (not shown) for detecting the direction and magnitude of a steering torque applied by the driver to the steering system (pinion 5a) and generating a steering torque signal T corresponding to the detected steering torque. The steering torque signal T including information about the direction of the steering torque is used or treated in a control unit as a main control signal for driving the electric motor 10 in such a way to control the output power (steering assist torque) of the electric motor 10.

Figure 2:
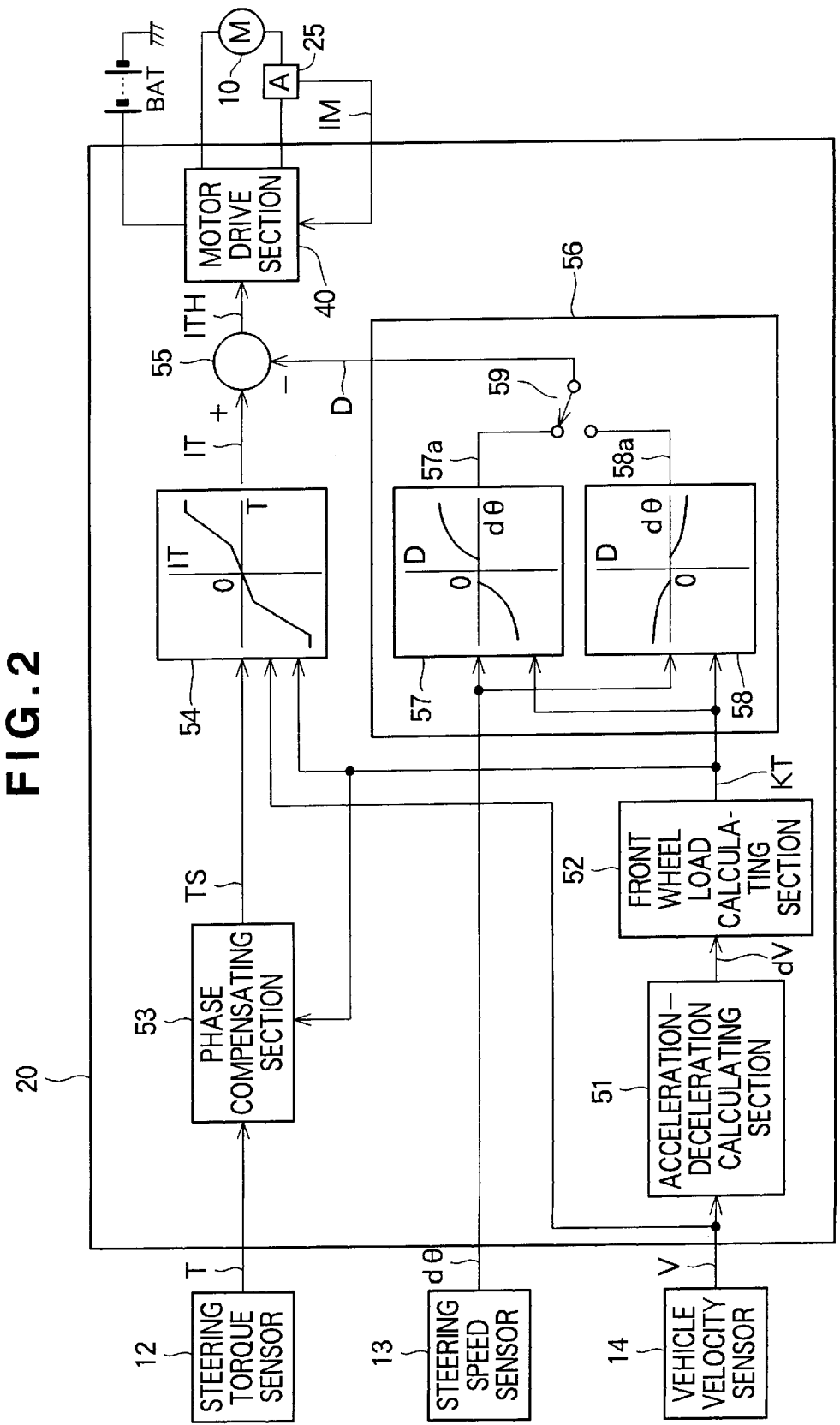
FIG. 2 is a block diagram showing a first embodiment of a control unit of the electric power steering apparatus.

Reference is made to FIG. 2 which shows in block diagram a first embodiment of the control unit 20. The control unit 20 is arranged to control operation of the electric motor 10 on the basis of a steering torque signal T supplied from the steering torque sensor 12, a steering speed signal dθ supplied from a steering speed sensor 13 and a vehicle velocity signal V supplied from a vehicle velocity sensor 14, and thereby controls the steering assist torque supplied from the electric motor 10. In FIG. 2 reference character BAT denotes a battery power source, and numeral 25 denotes a motor current detecting device or sensor.

The steering torque sensor 12, as previously described, detects the direction and magnitude of a steering torque of the steering system and generates a steering torque signal T including information about the direction of the detected steering torque.

The steering speed sensor 13 detects the direction and speed of rotation of the steering shaft 3 (FIG. 1) and generates a steering speed signal dθ including information about the steering direction. Because there is a certain relationship established between the motor speed (rotational speed of the electric motor 10) and the steering speed, the steering speed sensor 13 may alternatively be arranged to detect the rotational direction and speed of the electric motor 10 and generates a steering speed signal dθ including information about the steering direction. As a further alternative, instead of achieving direct detection of the rotational speed and direction of the electric motor 10, the steering speed sensor 13 may first detect a motor current IM and a motor voltage EM, then determines by calculation using the following Equation (1) a motor speed VM, and finally obtains from the motor speed VM and the polarity of the motor current IM (or motor voltage EM) a steering speed signal dθ including information about the steering direction.

$$VM=(EM-IM \cdot RM)/Kp \quad (1)$$

where RM is the resistance of the electric motor, and Kp is the induced voltage coefficient.

The vehicle velocity sensor 14 used in the illustrated embodiment is constructed to detect the direction and velocity of movement of the vehicle and output a vehicle velocity signal V including information about the moving direction (advancing state or revering state) of the vehicle.

The control unit 20 is generally comprised of an acceleration and deceleration calculating section 51, a front wheel load calculating section 52, a phase compensating section 53, a main control amount setting section 54, a subtractor 55, a damping correction value setting section 56, and a motor drive section 40. The damping correction value setting section 56 includes a steering proceeding state damping correction value setting part 57, a steering return state damping correction value setting part 58, and a damping correction value selecting part 59. The vehicle velocity sensor 14, the acceleration and deceleration calculating section 51 and the front wheel load calculating section 52 jointly form a acceleration-deceleration detecting means or detector. Though not shown in FIG. 2, the control unit further includes three analog-to-digital (A/D) converters respectively associated with the steering torque sensor 12, steering speed sensor 13 and vehicle velocity sensor 14 for analog-to-digital conversion of the signals T, dθ and Vd output respectively from the sensors 12, 13 and 14.

The acceleration and deceleration calculating section 51 determines acceleration and deceleration of the vehicle by differentiating the vehicle velocity signal V supplied from the vehicle velocity sensor 14 and outputs the determined acceleration and deceleration dV of the vehicle. The acceleration and deceleration calculating section 51 may alternatively be arranged to determine acceleration and deceleration dV of the vehicle on the basis of the increase or decrease of the vehicle velocity signal V per each unit time. The acceleration or deceleration dV output from the acceleration and deceleration calculating section 51 includes information about whether the vehicle is in the advancing state (moving forward) or in the reversing state (moving backward). The acceleration or deceleration dV of the vehicle is supplied to the front wheel load calculating section 52.

The front wheel load calculating section 52 determines (or estimates) by calculation a change in the vehicle load (or a change in the tire spring component) applied to the front wheels 9 (FIG. 1) on the basis of the acceleration or deceleration dV including information about the direction of vehicle travel (advancing state or reversing state), and outputs the determined front wheel load change or variation KT. More specifically, the front wheel load calculating section 52 outputs a front wheel load variation KT with a negative symbol (−) affixed thereto when the vehicle is advancing (moving forward) with accelerated velocity, a front wheel load variation KT with a positive symbol (+) affixed thereto when the vehicle is advancing (moving forward) with decelerated velocity, a front wheel load variation KT with positive symbol (+) affixed thereto when the vehicle is reversing (moving backward) with accelerated velocity, and a front wheel load variation KT with negative symbol (−) affixed thereto when the vehicle is reversing (moving backward) with decelerated velocity. Thus, in dependence of a combination of acceleration, deceleration, advancing and reversing of the vehicle, the front wheel load calculating section 52 outputs a front wheel load variation KT with a negative symbol (−) affixed thereto when the load on the front wheels decreases, and a front wheel load variation KT with a positive symbol (+) affixed thereto when the load on the front wheels increases. The absolute value of the front wheel load becomes large as the vehicle acceleration or deceleration increases. The front wheel load variation KT is supplied to the phase compensating section 53, the main control amount setting section 54 and the damping correction value setting section 56.

The phase compensating section 53 carries out phase compensation of the steering torque signal T and outputs a phase-compensated steering torque signal TS. The phase compensating section 53 is arranged to change or alter the frequency characteristics of phase compensation on the basis of the front wheel load variation KT. The phase-compensated steering torque signal TS is supplied to the main control amount setting section 54. The phase compensating section 53 is formed by using a digital filter or a digital signal processor. The phase compensating section 53 may alternatively be constituted by an analog circuit in which instance an analog-to-digital converter is provided on a downstream side of the phase compensating section 53 for achieving analog-to-digital conversion of the phase-compensated steering torque signal TS.

Figure 3:
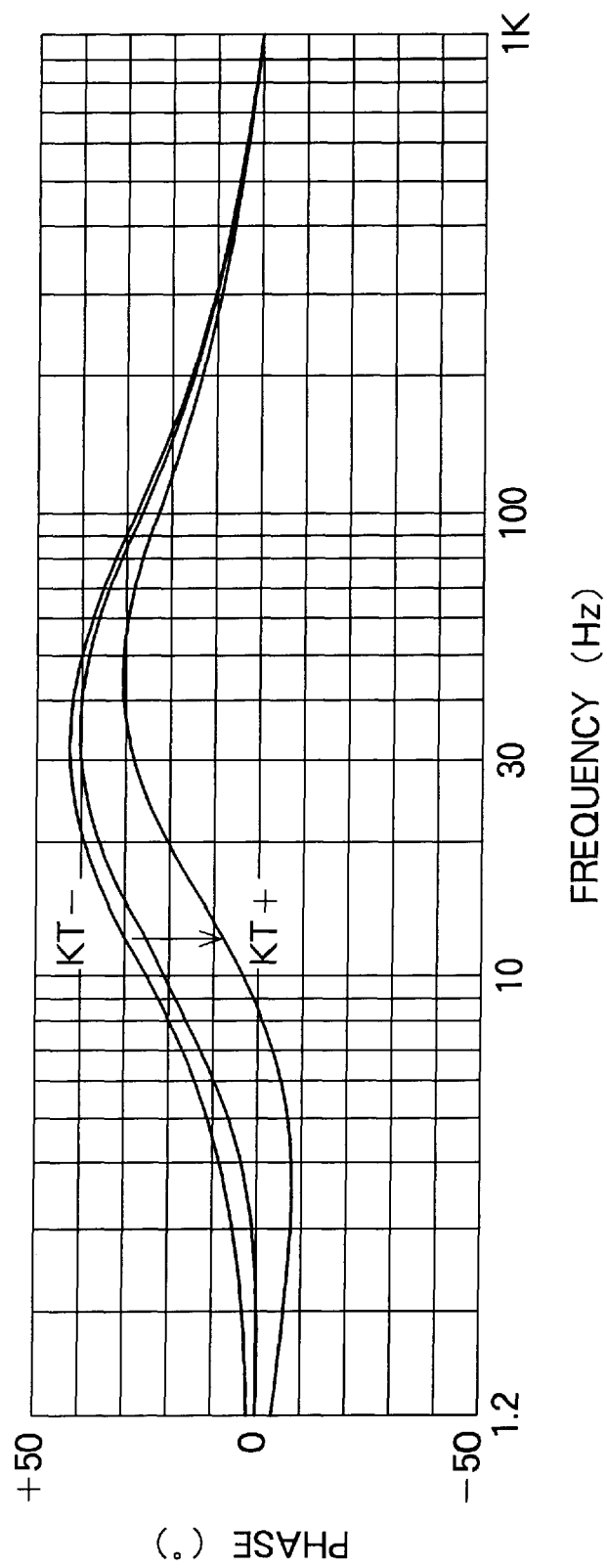
FIG. 3 is a graph showing an example of the phase-compensating characteristics (frequency characteristics of the phase) of a phase compensating section of the control unit.
Figure 4:
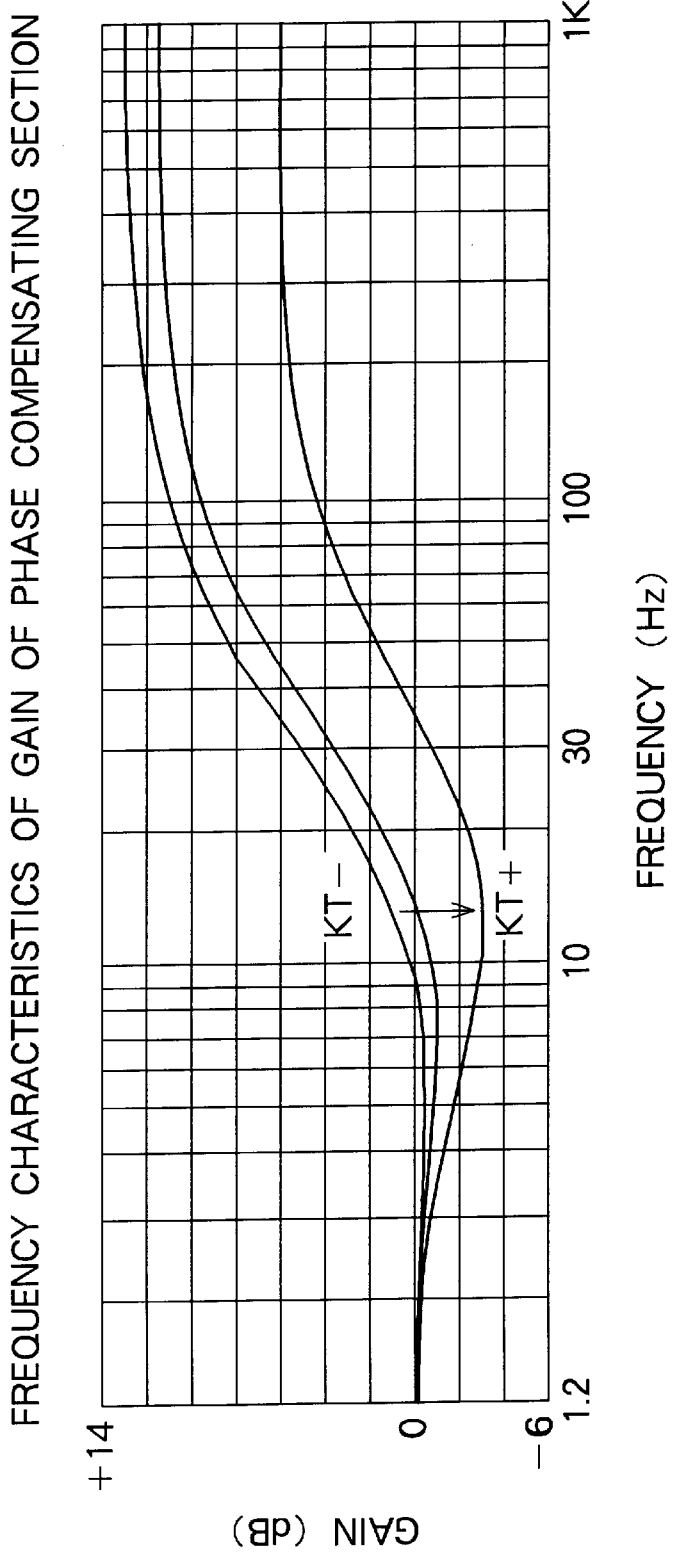
FIG. 4 is a graph showing an example of the phase-compensating characteristics (frequency characteristics of the gain) of the phase compensating section.

Reference is made to FIGS. 3 and 4 which show examples of the phase compensation characteristics of the phase compensating section 53 shown in FIG. 2. Especially, FIG. 3 is a graph showing the frequency characteristics of the phase of the phase compensating section 53, and FIG. 4 is a graph showing the frequency characteristics of the gain of the phase compensating section 53. The phase compensation is performed for the purpose of stabilizing operation of the entire system including various mechanical parts (mechanical system) and the control unit 20 (control system) by preventing the entire system from becoming unstable due to oscillation of the system (such as vibration of the steering wheel) caused by a change in the tire spring component, a delay in the response of the electric motor, loosening of joint portions and so on.

Assuming that the mechanism system has a resonance point at about 30 Hz, vibration of the steering wheel may be caused by a component of the steering torque signal T having a frequency of about 30 Hz. In this instance, if the phase compensating section 53 sets a peak of phase lead at about 30 Hz to provide a large phase lead at about 30 Hz, a large margin against oscillation (anti-oscillation margin) will be provided. However, since the phase compensation, due to its peculiarity, is a lag-and-lead compensation, the gain in a low frequency range (below 10 Hz) decreases, tending to deteriorate the response of the power steering apparatus (because of the decreasing of the assist ratio).

At the forward starting of the vehicle or at the advancing of the vehicle with accelerated velocity, since the load on the front wheels and the tire spring component become small, the mechanical system remains stable (and does not cause vibration of the steering wheel) even when no reduction of the gain is made by a phase-lag component of the phase compensation. In this instance (where the front wheel load variation KT has a negative (−) symbol), the phase-lag component is made small to increase the gain in the low frequency range, thereby increasing the assist ratio.

On the other hand, at the backward starting or at the advancing with decelerated velocity (where the front wheel load variation KT has a positive (+) symbol), the front wheel load and the tire spring component are increased. In this case, the phase-lag component is enlarged to lower the gain at about 30 Hz, thereby providing an enlarged anti-oscillation margin. Thus, in place of advancing or leading the phase to prevent oscillation, the gain is decreased by increasing the phase-lag component.

As shown in FIG. 2, the main control amount setting section 54 sets a main control amount IT on the basis of the phase-compensated steering torque signal TS, the vehicle velocity signal V and the front wheel load variation KT. The main control amount IT is subjected a compensation with the vehicle velocity and a compensation with the front wheel load variation that are carried out on the basis of the direction and magnitude of the phase-compensated steering torque signal TS. To this end, the main control amount setting section 54 is constructed by a conversion table prepared to output a main control amount IT set in advance in correspondence to a phase-compensated steering torque signal TS, a vehicle velocity signal V and a front wheel load variation KT. Use of the conversion table enables the main control signal IT to be output at a high speed (in a short time). The main control amount setting section (conversion table) 54 is constructed 20 such that the main control amount IT increases as the level of the phase-compensated steering torque signal TS increases; even when the phase compensated steering torque signal TS is constant, the main control amount IT increases as the level of the vehicle velocity signal V increases; even when the phase-compensated steering torque signal TS and the vehicle velocity signal V are constant, if the front wheel load variation KT is negative (−), that is, when the vehicle is starting in the forward direction or moving forward with accelerated velocity, the main control amount IT decreases with an increase in the front wheel load variation KT; and even when the phase-compensated steering torque signal TS and the vehicle velocity signal V are constant, if the front wheel load variation KT is positive (+), that is, when the vehicle is starting in the backward direction or moving forward with decelerated velocity, the main control amount IT increases with an increase in the front wheel load variation KT. The main control amount IT is supplied to the subtractor 55.

The steering proceeding state damping correction value setting part 57 outputs a steering proceeding state damping correction value 57a on the basis of the steering speed signal dθ and the front wheel load variation KT. The steering proceeding state damping correction value setting part 57 is constructed by a conversion table prepared to output a steering proceeding state damping correction value 57a set in advance in correspondence to a steering speed signal dθ and a front wheel load variation KT. Use of the conversion table enables the steering proceeding state damping correction value setting part 57 to output the steering proceeding state damping correction value 57a at high speeds and in a short time. The steering proceeding state damping correction value setting part (conversion table) 57 is constructed such that the steering proceeding state damping correction value 57a increases with an increase in the level of the steering speed signal dθ; even when the steering speed signal dθ is constant, if the front wheel load variation KT has a negative (−) symbol, the steering proceeding state damping correction value 57a increases with an increase in the front wheel load variation KT; and even when the steering speed signal dθ is constant, if the front wheel load variation KT has a positive (+) symbol, the steering proceeding state damping correction value 57a decreases with an increase in the front wheel load variation KT.

The steering return state damping correction value setting part 58 outputs a steering return state damping correction value 58a on the basis of the steering speed signal dθ and the front wheel load variation KT. The steering return state damping correction value setting part 58 is constructed by a conversion table prepared to output a steering return state damping correction value 58a set in advance in correspondence to a steering speed signal dθ and a front wheel load variation KT. Use of the conversion table makes it possible to output the steering return state damping correction value 58a at high speeds and in a short time. The steering return state damping correction value setting part (conversion table) 58 is constructed such that the steering return state damping correction value 58a increases with an increase in the level of the steering speed signal dθ; even when the steering speed signal de is constant, if the front wheel load variation KT has a negative (−) symbol, the steering return state damping correction value 58a decreases with an increase in the front wheel load variation KT; and even when the steering speed signal dθ is constant, if the front wheel load variation KT has 18a positive (+) symbol, the steering return state damping correction value 58a increases with an increase in the front wheel load variation KT.

The damping correction value selecting part 59 selects the steering proceeding state damping correction value 57a when the steering wheel is in the steering proceeding state and the steering return state damping correction value 58a when the steering wheel is in the steering return state, and outputs the selected correction value 57a or 58a as a damping correction value D. The damping correction value D is supplied to the subtractor 55.

Judgment as to whether the steering wheel is in the steering proceeding state or in the steering return state is achieved by a steering state judging part (not shown). The steering state judging part judges the steering wheel to be in the steering proceeding state (in which the steering wheel is turned to steer the front wheels) when the direction of the steering torque signal T and the direction of the steering speed signal dθ match each other and to be in the steering return state (in which the steering wheel is caused to return to its neutral position by a self-aligning force or torque applied by tires on the front wheels) when the direction of the steering torque signal T and the direction of the steering speed signal dθ do not match each other.

The damping correction is achieved for the purpose of providing a damping effect on the steering wheel by applying a steering assist force or torque in a direction opposite to the direction of a steering-wheel returning force, such as the tire spring component or the self-aligning torque, tending to return the steering wheel to the neutral position. Because the front wheel load and the resulting tire spring component become small when the vehicle is starting in the forward direction or it is moving forward or advancing with accelerated velocity, the steering-wheel returning force and the resulting amount of steering wheel return motion are small. Thus, the damping effect is decreased. Conversely, at the backward starting or the advancing with decelerated velocity, the front wheel load and the resulting tire spring component increase and thereby produce a large steering-wheel returning force tending to increase the amount of steering wheel return motion. Accordingly, the damping effect is increased.

The subtractor 55 subtracts the correction value D from the main control amount IT and outputs the result of subtraction as a corrected control amount ITH. The corrected control amount ITH is supplied to the motor drive section 40 for controlling operation of the electric motor 10.

Figure 6:
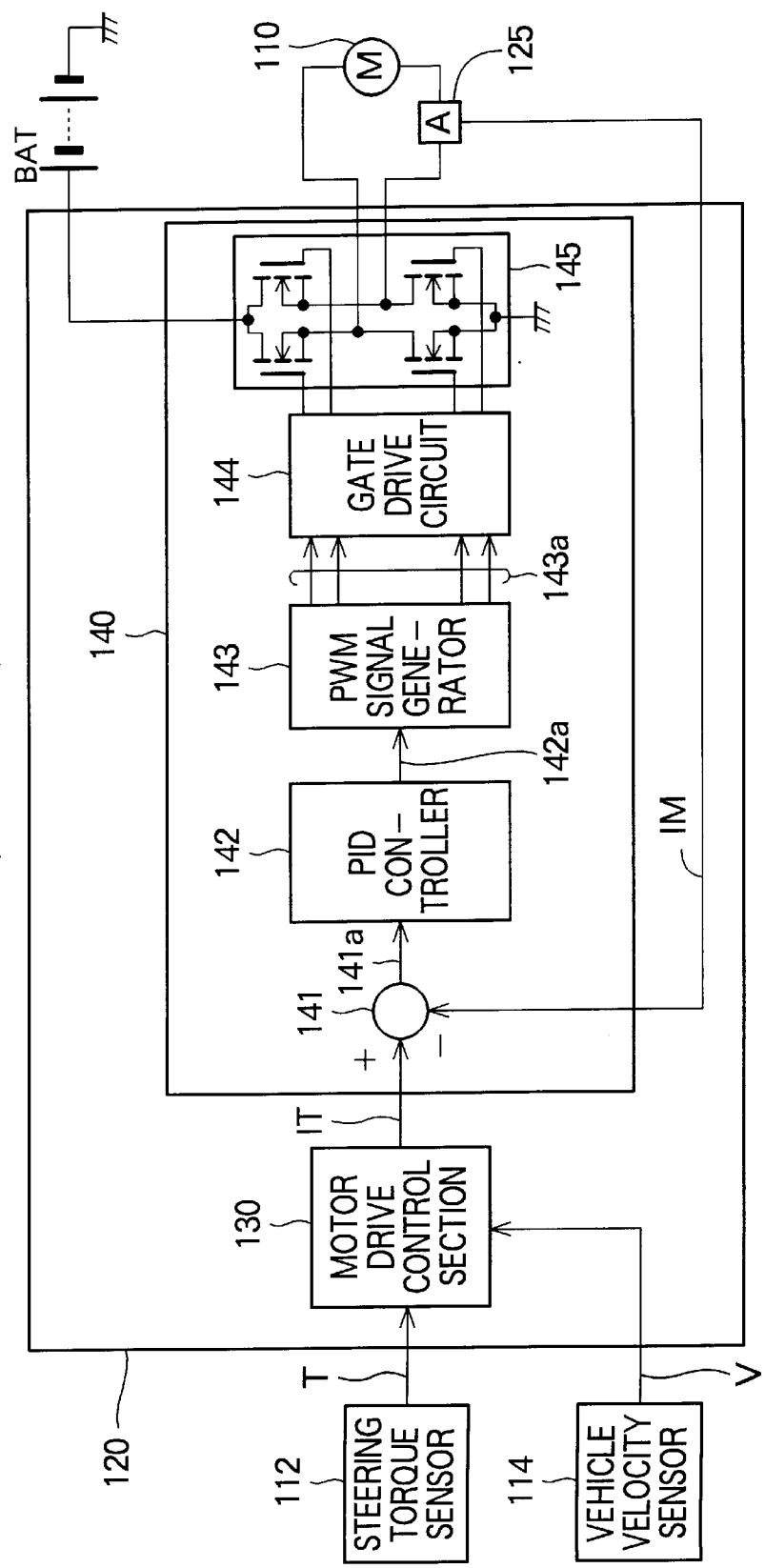
FIG. 6 is a block diagram showing an example of the conventional control unit.

The motor drive section 40 is structurally and functionally the same as the one 140 described previously with reference to FIG. 6, and a further description thereof can be omitted.

As described above, the electric power steering apparatus incorporating therein the control unit 20 shown in FIG. 2 is constructed to detect a change in the tire spring component (front wheel load variation KT) caused by the shift of a load on the vehicle due to acceleration and deceleration of the vehicle, and to change the phase compensating characteristics of the phase compensating section 53 on the basis of the front wheel load variation KT to automatically vary the assist ratio. With the electric power steering apparatus thus constructed, a good steering touch or feeling can be obtain.

Figure 5:
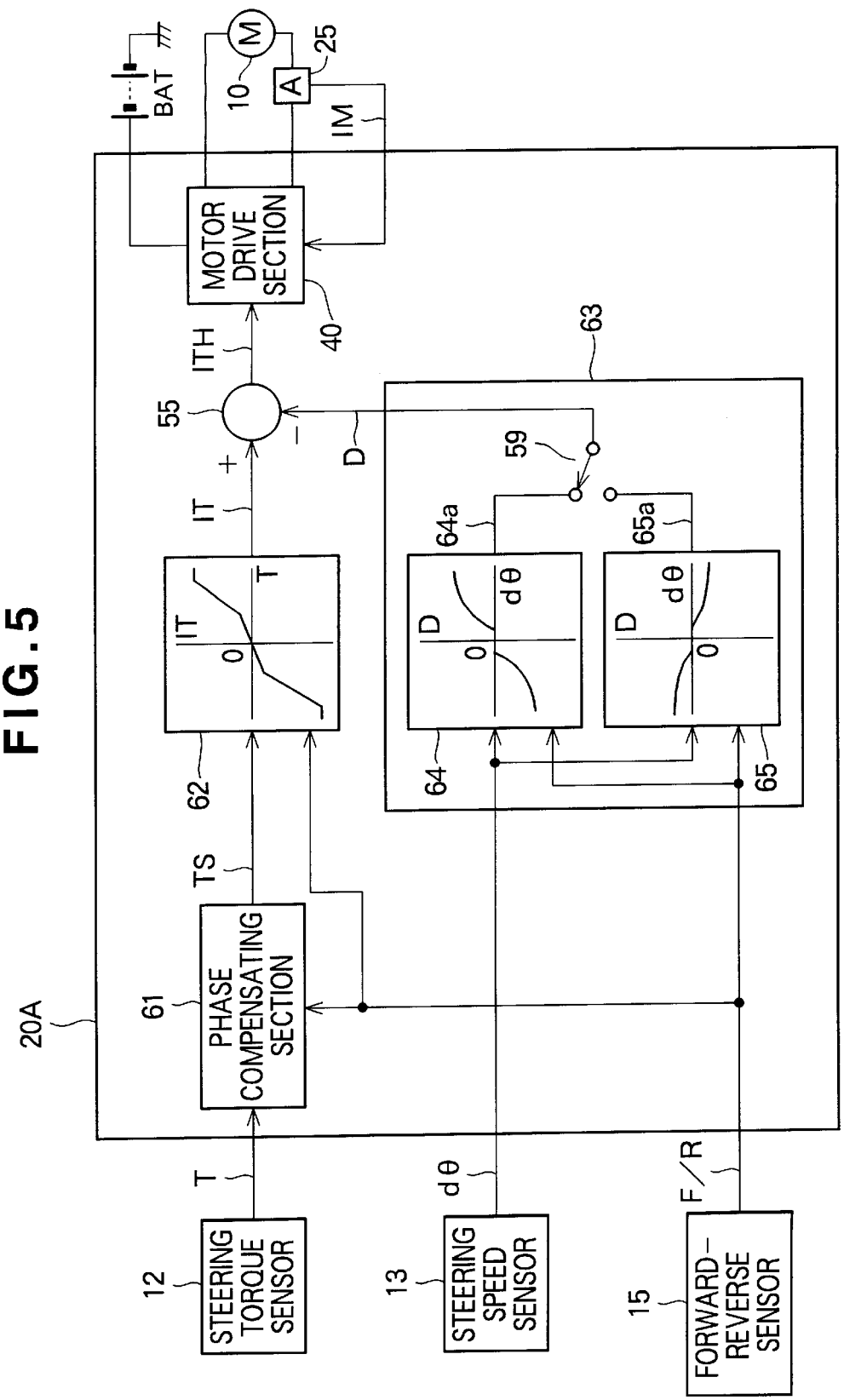
FIG. 5 is a block diagram showing a second embodiment of the control unit according to the present invention.

FIG. 5 shows in block diagram a second embodiment of the control unit according to the present invention.

The control unit 20A is constructed to regulate a steering assist torque supplied from an electric motor 10 by controlling operation of the electric motor 10 on the basis of a steering torque signal T output from a steering torque sensor 12, a steering speed signal dθ output from a steering speed sensor 13, and information F/R as to whether the vehicle is moving forward (i.e., advancing) or backward (i.e., reversing) output from a forward and reverse sensor 15. In FIG. 5 reference character BAT denotes a battery power source, and numeral 25 denotes a motor current sensor.

The steering torque sensor 12 and the steering speed sensor 13 are the same as those 12, 13 used in the first embodiment shown in FIG. 2. The forward-reverse sensor 15 detects whether the vehicle is in the advancing state or in the reversing state of the vehicle on the basis of the position of a shift/control lever in a manual or an automatic transmission, and outputs forward information (information about the advancing state) F or reverse information R (information about the reversing state).

The control unit 20A is generally comprised of a phase ompensating section 61, a main control amount setting section 62, a damping correction value setting section 63, a subtractor 55, and a motor drive section 40.

The damping correction value setting section 63 includes a steering proceeding state damping correction value setting part 64, a steering return state damping correction value setting part 65, and a damping correction value selecting part 59.

The phase compensating section 61 carries out phase compensation of the steering torque signal T and outputs a phase-compensated steering torque signal TS. The phase compensating section 61 has two different sorts of phase compensating characteristics, one being used for phase-compensation of the steering torque signal T when the vehicle is in the advancing state and the other for phase-compensation of the steering torque signal T when the vehicle is in the reversing state. More specifically, the phase compensating section 61 is constructed to output, on the basis of the forward information F or the reverse information R, a phase-compensated steering torque signal TS with which phase compensation has been carried out by using either the phase compensating characteristics for advancing state (similar to those used in the embodiment of FIG. 2 when the front wheel load variation is negative) when the vehicle is in the advancing state, or the phase compensating characteristics for reversing state (similar to those used in the embodiment of IG. 2 when the front wheel load variation is positive) when the vehicle is in the reversing state. The phase-compensated steering torque signal TS is supplied to the main control amount setting section 62.

The main control amount setting section 62 sets a main control amount IT on the basis of the phase-compensated steering torque signal TS and the forward and reverse information F/R. The main control amount setting section 62 has a main control amount setting first conversion table prepared for exclusive used with the forward information (advancing-state information) F and a main control amount setting second conversion table prepared for exclusive use with the reverse information (reversing-state information) R. When the vehicle is in the advancing state, the main control amount setting section 62 outputs a main control amount IT for the advancing state using the first conversion table. Similarly, when the vehicle is in the reversing state, the main control amount setting section 62 outputs a main control amount IT for the reversing state using the second conversion table. In the latter case (reversing state), since the force needed to turn the steering wheel becomes larger than the one needed in the former case (advancing state) due to an increase in the front wheel load, the main control amount IT output from the main control amount setting section 62 is set to be larger than the one output in the advancing state. The main control amount IT is supplied to the subtractor 55.

The steering proceeding state damping correction value setting part 64 outputs a steering proceeding state damping correction value 64a on the basis of the steering speed signal dθ and the forward and reverse information F/R. This part 64 has two steering proceeding state damping correction value setting conversion tables one for exclusive use with the forward information (advancing-state information) F and the other for exclusive use with the reverse information (reversing-state information) R. For outputting the steering proceeding state damping correction value 64a, the steering proceeding state damping correction value setting part 64 uses the first-mentioned conversion table when the vehicle is in the advancing state and the second-mentioned conversion table when the vehicle is in the reversing state.

The steering return state damping correction value setting part 65 outputs a steering return state damping correction value 65a on the basis of the steering speed signal dθ and the forward and reverse information F/R. This part 65 has two steering return state damping correction value setting conversion tables prepared for exclusive use with the forward information (advancing-state information) F and the reverse information (reversing-state information) R, respectively. For outputting the steering return state damping correction value 65a from the steering return state damping correction value setting part 65, the first-mentioned conversion table is used when the vehicle is in the advancing state while the second-mentioned conversion table is used when the vehicle is in the reversing state.

The damping correction value selecting part 59 selects the steering proceeding state damping correction value 64a when the steering wheel is in the steering proceeding state and the steering return state damping correction value 65a when the steering wheel is in the steering return state, and outputs the selected correction value 64a or 65a as a damping correction value D. The damping correction value D is supplied to the subtractor 55.

Judgment as to whether the steering wheel is in the steering proceeding state or in the steering return state is achieved by the non-illustrated steering state judging part.

The damping correction is achieved for the purpose of providing a damping effect on the steering wheel by applying a steering assist force or torque in a direction opposite to the direction of a steering-wheel returning force, such as the tire spring component or the self-aligning torque, tending to return the steering wheel to the neutral position. Because the front wheel load and the resulting tire spring component become small when the vehicle is in the advancing state, the steering-wheel returning force and the resulting amount of steering wheel return motion are small. Thus, the damping effect is decreased. Conversely, when the vehicle is in the reversing state, the front wheel load and the resulting tire spring component increase and thereby produce a large steering-wheel returning force tending to increase the amount of steering wheel return motion. Accordingly, the damping effect is increased.

The subtractor 55 subtracts the correction value D from the main control amount IT and outputs the result of subtraction as a corrected control amount ITH. The corrected control amount ITH is supplied to the motor drive section 40 for controlling operation of the electric motor 10. The motor drive section 40 is the same in construction as the one 40 used in the embodiment shown in FIG. 2.

As described above, the electric power steering apparatus equipped with the control unit 20A shown in FIG. 5 can change the assist ratio depending on whether the vehicle is moving forward or reversing. In case of a steering operation taken along with repeated forward and reverse starts from the rest, a steering feel at the forward start is made substantially the same as a steering feel at the reverse start. In addition, since the phase compensation characteristics are changed depending on whether the vehicle is moving forward or reversing, the assist response characteristic can be maintained uniform regardless of a change in the tire spring component caused due to a change in the direction of movement of the vehicle. Because of a main control amount set to be greater at the reversing of the vehicle than at the advancing of the vehicle, a steering assist can be adjusted to a value suitable for operation of the steering wheel with a single hand of the driver.

Obviously, various minor changes and modifications of the present invention are possible in the light of the above teaching. It is to be understood that within the scope of the appended claims the present invention may be practiced otherwise than as specifically described.

What is claimed is:

1. An electric power steering apparatus for a vehicle, comprising:
   an electric motor for applying a steering assist torque to a steering system of the vehicle;
   a steering torque sensor for detecting a steering torque of said steering system;
   an acceleration and deceleration detector for detecting acceleration and deceleration of the vehicle; and
   a control unit for controlling operation of said electric motor on the basis of an output signal from said steering torque sensor and an output signal from said acceleration and deceleration detector.

2. An electric power steering apparatus according to claim 1, wherein said acceleration and deceleration detector detects a change in the load on front wheels of the vehicle resulting from a shift of the vehicle load caused due to acceleration or deceleration of the vehicle.

3. An electric power steering apparatus according to claim 1, wherein said acceleration and deceleration detector includes a vehicle velocity sensor for detecting a velocity of the vehicle, an acceleration and deceleration calculating section for calculating acceleration and deceleration on the basis of the vehicle velocity detected by said vehicle velocity sensor, and a front wheel load calculating section for calculating a change in the load on front wheels of the vehicle on the basis of the acceleration and deceleration detected by said acceleration and deceleration detector.

4. An electric power steering apparatus according to claim 3, wherein said control unit further includes a phase compensating section for carrying out phase compensation of a steering torque detected by said steering torque sensor, on the basis of the change in the front wheel load calculated by said front wheel load calculating section.

5. An electric power steering apparatus according to claim 4, wherein said control unit further includes a main control amount setting section for setting a main control amount on the basis of the steering torque phase-compensated by said phase compensating section, the vehicle velocity detected by said vehicle velocity sensor, and the change in the front wheel load calculated by said front wheel load calculating section.

6. An electric power steering apparatus according to claim 5, wherein said control unit further includes a steering speed sensor for detecting a steering speed of the vehicle, and a damping correction value setting section for setting a damping correction value on the basis of the steering speed detected by the steering speed sensor, and the change in the front wheel load calculated by said front wheel load calculating section, and wherein said control unit determines from said main control amount and said damping correction value, a correction control amount for controlling a current to be supplied to said electric motor.

7. An electric power steering apparatus for a vehicle, comprising:
   an electric motor for applying a steering assist torque to a steering system of the vehicle;
   a steering torque sensor for detecting a steering torque of said steering system;
   a forward and reverse sensor for detecting whether the vehicle is moving in the forward direction or in the backward direction; and
   a control unit for controlling operation of said electric motor on the basis of an output signal from said steering torque sensor and an output signal from said forward and reverse sensor wherein said control unit further includes a phase compensating section for carrying out phase compensation of a steering torque detected by said steering torque sensor, on the basis of said output signal from said forward and reverse sensor.

8. An electric power steering apparatus according to claim 7, wherein said control unit further includes a main control amount setting section for setting a main control amount on the basis of the steering torque phase-compensated by said phase compensating section, and said output signal from said forward and reverse sensor.

9. An electric power steering apparatus according to claim 8, wherein said control unit further includes a steering speed sensor for detecting a steering speed of the vehicle, and a damping correction value setting section for setting a damping correction value on the basis of the steering speed detected by the steering speed sensor, and said output signal from said forward and reverse sensor, and wherein said control unit determines from said main control amount and said damping correction value, a correction control amount for controlling a current to be supplied to said electric motor.

* * * * *